Aug. 4, 1936.　　　　K. C. BUGG　　　　2,050,083
BRAKE EQUALIZER
Filed July 5, 1935
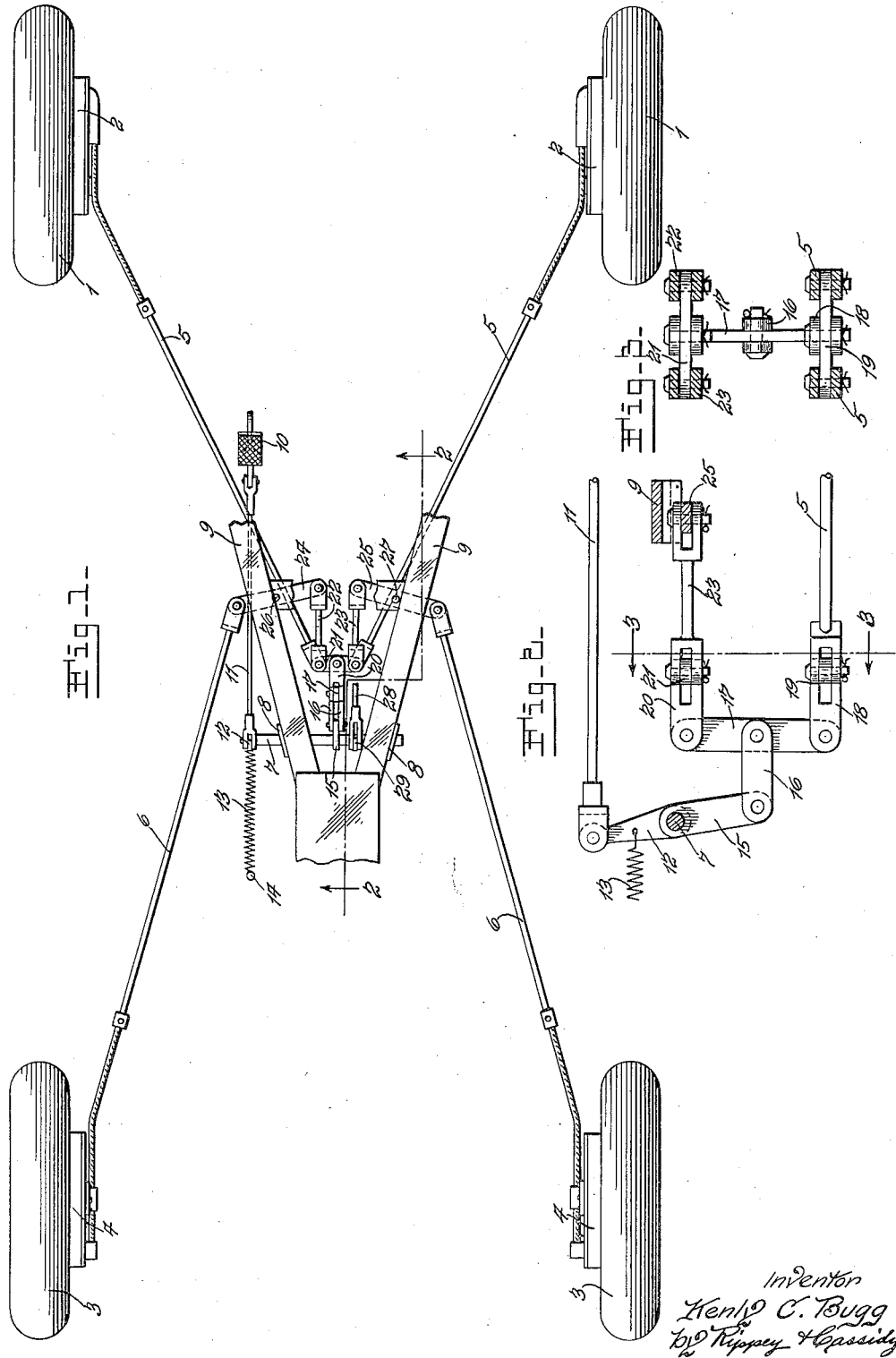
Inventor
Kenl? C. Bugg
by Rippey & Cassidy
His Attorneys Patented Aug. 4, 1936

2,050,083

UNITED STATES PATENT OFFICE 2,050,083

BRAKE EQUALIZER

Kenly C. Bugg, Farmington, Mo.

Application July 5, 1935, Serial No. 29,963

5 Claims. (Cl. 188—204)

This invention relates to brake equalizers, and has special reference to a mechanism for equalizing automobile brakes.

An object of the invention is to provide a mechanism operative by the usual brake pedal of an automobile for operating the brakes so as to set the brakes with approximately uniform pressure or braking effect irrespective of whether the brakes are precisely and uniformly adjusted or not.

Another object of the invention is to provide means for operating the equalizing and brake operating mechanism by the usual emergency brake connections, as well as by the usual brake pedal.

Another object of the invention is to provide a mechanism of the character mentioned that is of simplified and durable construction, and which may be mounted on the automobile and connected with the brakes and with the brake pedal and emergency brake operating device at comparatively low and permissible cost.

Other objects will be apparent from the following description, reference being made to the annexed drawing, in which—

Fig. 1 is a plan view of my improved brake equalizer connected with the brake operating rods.

Fig. 2 is an enlarged vertical longitudinal sectional view approximately on the line 2—2 of Fig. 1.

Fig. 3 is a vertical transverse sectional view approximately on the line 3—3 of Fig. 2.

The wheels 1 are the front wheels and are equipped with familiar and known brake mechanisms within the drums 2. The wheels 3 are the rear wheels of the automobile and are equipped with known mechanical brake mechanisms within the drums 4. The parts of the brake mechanisms contained within the drums 2 and 4 are not illustrated. Many types of mechanical brakes are known, and the present invention is applicable thereto.

The brakes that are contained in the drums 2 on the front wheels are operated by links 5 and the brakes for the rear wheels are operated by the links 6.

My improved brake equalizer is operatively connected with the links 5 and 6 and includes a horizontal rock shaft 7 supported in bearings 8 on the automobile frame or chassis 9. The usual pivotally supported brake operating pedal 10 is connected with the forward end of a link 11 the rear end of which is pivoted to the upper end of an arm 12 attached to the rock shaft 7. A spring 13 has its forward end connected with the arm 12 and its rear end attached to a rigid part 14 of the automobile frame. When the pedal 10 is pushed forwardly, the link 11 turns the shaft 7 forwardly in opposition to the spring 13. When the brake pedal 10 is released, the spring 13 retracts and turns the shaft 7 rearwardly and thereby moves the link 11 and the brake pedal 10 to idle positions.

An arm 15 is attached to and extends downwardly from the shaft 7 approximately equidistant from the spaced side portions of the frame or chassis 9. A link device 16 has its rear end pivoted to the lower end of the arm 15 and its forward end pivoted to an approximately vertical connecting member 17. The rear end of a forwardly extended link 18 is pivoted to the lower end of the connecting member 17, and the forward end of said link 18 is pivoted to a transverse connecting member 19 approximately midway of the ends of said connecting member. The rear ends of the rods 5 are pivoted to the respective ends of the connecting member 19. The rear end of a link 20 is pivoted to the upper end of the connecting member 17, and the forward end of said link 20 is pivoted to the middle of a transverse connecting member 21. Links 22 and 23 have their rear ends pivoted to the respective ends of the connecting member 21 and their forward ends pivoted to the inner ends of levers 24 and 25, respectively. The levers 24 and 25 are mounted for horizontal swinging movements on pivots 26 and 27, respectively, and the outer ends of said levers 24 and 25 are pivotally connected with the forward ends of the respective links 6.

A link 28 has its front end operatively connected with the usual emergency brake lever (not shown) and its rear end connected with an upwardly extended arm 29 attached to the shaft 7 so that effective operation of said emergency brake lever will turn the shaft 7 forwardly in opposition to the spring 13 the same as effective forward movement of the brake pedal 10 will turn the shaft 7 forwardly in opposition to the spring 13.

It should now be clear that effective operation of the brake pedal 10 or the emergency brake lever (not shown) will apply or set all of the brakes with approximately uniform pressure or braking effect irrespective of whether all of the brake parts have the same adjustment or not. If it be assumed that the brake parts for the front wheels are not in the same accurate adjustment, the pivotal connections from the shaft 7 to the connecting member 19 will operate the brake parts for the front wheels with approximately uniform pressure or braking effect since the connecting member 19 may move about its pivot and apply approximately equal draft to the rod 5.

Similarly, due to the pivotal mounting of the connecting member 21, approximately uniform pressure or braking effect will be applied to the brake parts for the rear wheels because the levers 24 are free to operate unequal distances.

Also, due to the pivotal mounting of the connections from the rock shaft 7 to the connecting member 19 for the rods 5 and the connecting member 21 for the rods 6, all of the brakes, namely the brakes for the front wheels and the brakes for the rear wheels, will be set with approximately uniform pressure and braking effect.

It should now be apparent that this invention attains all of its intended objects and purposes efficiently and satisfactorily; that the invention is substantially free from complicated structures and devices and, on the contrary, is of simplified construction and arrangement. Furthermore, the invention may be constructed and mounted in connection with the brake operating devices of an automobile at comparatively low and permissible cost.

The invention may be varied within the scope of equivalent limits without departure from the nature and principle thereof.

I claim:—

1. In an automobile having front wheel and rear wheel brakes, rods for setting the front wheel brakes and rods for setting the rear wheel brakes; a member pivotally connecting said rods for the front wheel brakes, levers pivotally supported intermediate of their ends and having their outer ends pivotally connected with said rods for the rear wheel brakes, links pivotally connected with the inner ends of said levers, a member pivotally connecting said links, a connecting member pivotally connected with said two first named members, a rock shaft, an arm attached to said rock shaft, a link pivotally connecting said arm with said last named member for operating the same and thereby said first named member and said levers relatively as required to cause said rods to set the respective brakes with approximately uniform pressure or braking effect, and an operating connection for turning said rock shaft.

2. In an automobile having front wheel and rear wheel brakes, rods for setting the front wheel brakes and rods for setting the rear wheel brakes; a member pivotally connecting said rods for the front wheel brakes, levers pivotally supported intermediate of their ends and having their outer ends pivotally connected with said rods for the rear wheel brakes, links pivotally connected with the inner ends of said levers, a member pivotally connecting said links, a connecting member pivotally connected with said two first named members, a rock shaft, an arm attached to said rock shaft, a link pivotally connecting said arm with said last named member for operating the same and thereby said first named member and said levers relatively as required to cause said rods to set the respective brakes with approximately uniform pressure or braking effect, a foot pedal, an additional arm attached to said rock shaft, and a link connecting said foot pedal with said additional arm for turning said rock shaft to set the brakes as aforesaid.

3. In an automobile having front wheel and rear wheel brakes, rods for setting the front wheel brakes and rods for setting the rear wheel brakes; a member pivotally connecting said rods for the front wheel brakes, levers pivotally supported intermediate of their ends and having their outer ends pivotally connected with said rods for the rear wheel brakes, links pivotally connected with the inner ends of said levers, a member pivotally connecting said links, a connecting member pivotally connected with said two first named members, a rock shaft, an arm attached to said rock shaft, a link pivotally connecting said arm with said last named member for operating the same and thereby said first named member and said levers relatively as required to cause said rods to set the respective brakes with approximately uniform pressure or braking effect, and foot pedal and emergency brake connections for turning said rock shaft to set the brakes as aforesaid.

4. In a vehicle having front wheel and rear wheel brakes, connections for setting the front wheel brakes and connections for setting the rear wheel brakes; a member pivotally connecting said connections for the front wheel brakes, levers pivoted to said connections for the rear wheel brakes, a rock shaft, connections for turning said shaft in one direction from a starting position, and means operatively connected with said rock shaft and with said member and with said levers, respectively, for operating said connections and equalizing the pressure or braking effect of the brakes operated thereby.

5. In a vehicle having front wheel and rear wheel brakes, a pair of connections for setting the front wheel brakes and a pair of connections for setting the rear wheel brakes; levers pivotally connected with one of said pairs of connections, a member pivotally connecting the other pair of said connections, a rock shaft, means for turning said rock shaft in one direction from a starting position, and devices operated by said rock shaft and pivotally connected with said levers and with said member, respectively, for simultaneously operating said connections and equalizing the pressure or braking effect of the brakes operated thereby.

KENLY C. BUGG.